US008167658B1

(12) United States Patent
Liu (10) Patent No.: US 8,167,658 B1
(45) Date of Patent: May 1, 2012

(54) COMBINED STRUCTURE OF A USB PLUG WITH A BUILT-IN CARD-READING SLOT (76) Inventor: Chen-Ya Liu, Taoyuan County (TW)

(*) Notice: Subject to any disclaimer, the term of this patent is extended or adjusted under 35 U.S.C. 154(b) by 0 days.

(21) Appl. No.: 12/960,721

(22) Filed: Dec. 6, 2010

(51) Int. Cl.
H01R 24/00 (2011.01)
(52) U.S. Cl. ........................................................ 439/630
(58) Field of Classification Search .................. 439/630, 439/631, 638, 639, 634
See application file for complete search history.

(56) References Cited

U.S. PATENT DOCUMENTS

| 7,178,736 | B2* | 2/2007 | Yu et al. | 235/486 |
|---|---|---|---|---|
| 7,354,312 | B2* | 4/2008 | Chuang | 439/630 |
| 7,364,439 | B2* | 4/2008 | Lin | 439/76.1 |
| 7,575,481 | B1* | 8/2009 | Liu | 439/660 |
| 7,632,151 | B2* | 12/2009 | Wang et al. | 439/630 |
| 8,061,608 | B2* | 11/2011 | Liao et al. | 235/439 |
| 2008/0009197 | A1* | 1/2008 | Lin | 439/660 |
| 2008/0096413 | A1* | 4/2008 | Chen | 439/345 |
| 2010/0032485 | A1* | 2/2010 | Liao et al. | 235/441 |
| 2011/0217878 | A1* | 9/2011 | Liu et al. | 439/630 |

* cited by examiner

Primary Examiner — Ross Gushi
(74) Attorney, Agent, or Firm — Rosenberg, Klein & Lee (57) ABSTRACT A combined structure of a USB plug with a built-in card-reading slot, and more particular, a combined structure for the patent application U.S. Pat. No. 7,575,481 that permit a convenient manufacturing and meets different needs. An isolation base is provided in cooperation with two or three different isolation pieces which are joined by a hooked connection to create a module. The isolation pieces are each provided with an engaging slot. It is possible to choose the desired terminal set of certain type to achieve the predetermined functions of a certain USB specification. A metal housing meeting the specification of USB A-type plug dimensions encloses the compound connection module, thereby creating a first slot for the electric connection with the female connector of USB 2.0 or USB 3.0. Meanwhile, a second slot is provided for the insertion of the thin-type Micro SD/T-Flash memory card. Accordingly, a USB plug with a built-in card-reading slot is created. Moreover, the USB plug is an independent connection element that allows for a convenient connection with circuit boards or electronic products having different functions. As a result, the requirements of different electronic products are fulfilled.

10 Claims, 13 Drawing Sheets

COMBINED STRUCTURE OF A USB PLUG WITH A BUILT-IN CARD-READING SLOT

BACKGROUND OF THE INVENTION

1. Field of the Invention

The invention relates to a combined structure of a USB plug with a built-in card-reading slot, and more particular to a combined structure that permits a more convenient manufacturing and meets different needs for the patent application U.S. Pat. No. 7,575,481.

2. Description of the Related Art

Universal Serial Bus is referred to as USB. It was developed by some leading computer manufacturers such as Compaq, Intel, Microsoft, Digital Equipment, NEC, IBM and Northern Telecom.

USB connector is a standard connection interface. It unifies the various connectors of peripheral devices and acts like a "universal connector." With the development of the electronics, communications and of digital electronics, no one will doubt the popularity and the importance of USB connector in our daily life.

As new digital products continue to be introduced in the market, memory cards in various specifications and capacities, such as Micro SD (a smaller memory card) and Mini SD (a bigger memory card) have been developed and are currently popular in the market. Due to the emergence of a memory card, a card reader is normally required and acts as an interface for the interconnection between the memory card and the host computer. It is common that the USB female connector in the host computer is employed for data transfer. However, the card readers currently in the market have a too large volume. Compared with a small memory card, the card reader not only occupies much space but also increases the inconvenience during the use.

According to the prior art (U.S. Pat. No. 7,575,481, disclosed by the applicant of the present invention), a USB plug with a built-in card-reading slot includes a metal housing meeting the specification of USB A-Type plug dimensions and an isolation substrate enclosed by the metal housing. The first surface has a first slot in electric connection to a USB female plug. The thickness of partial portion of the isolation substrate is less than 1.2 mm such that a second slot for the insertion of a thin-type Micro SD/T-Flash memory card is formed between the second surface and the second wall. Moreover, a plurality of metal terminals is positioned on the second surface for an electric connection to the memory card such that the second slot is formed as a thin-type card-reading slot for the Micro SD/T-Flash memory card. In addition, an indentation is formed at the tail of the second wall for the insertion of the protrusion of the Micro SD/T-Flash memory card such that the protrusion just fits into the indentation when the memory card is inserted into the second slot. Besides, the contour still meet the specification of the standard USB plug such that a normal USB operation won't be affected when the USB plug is attached to a terminal portion of an electronic product.

After release of the above-mentioned product, it obtained recognition and praise from the market. On the basis of the structure of a USB plug with a built-in card-reading slot, the applicant of the present invention have been devoted to the research and improvement of the product and tried to provide a variety of solutions to meet different needs in the electronic industry. The product will be more practical and convenient when the USB plug becomes a separate connecting element for an easy combination with circuit boards or electronic products with different functions.

SUMMARY OF THE INVENTION

An object of the invention is to provide a combined structure of a USB plug with a built-in card-reading slot, and more particular, a combined structure that permits a more convenient and modularized manufacturing and assembly for the patent application U.S. Pat. No. 7,575,481. Moreover, a different connection depending on various requirements is ensured. In addition, the USB plug is an independent connection element that allows for a convenient connection with circuit boards or electronic products having different functions. In this way, a convenient use is ensured.

Another object of the invention is to provide a combined structure of a USB plug with a built-in card-reading slot that includes all functions of the prior art. Moreover, the plug having the USB 2.0 and/or USB 3.0 can be created depending on needs. In other words, a module having two specifications is achieved to obtain more options in use.

In order to achieve the above-mentioned objects, the invention includes:

a) an isolation base having a first surface and a second surface, a plurality of first mounting recesses and second mounting recesses for receiving a plurality of terminals being positioned on the first surface, the isolation base further having a first indentation and a second indentation at both sides of the rear portion thereof, respectively;

b) a first isolation piece mounted on the first surface of the isolation base, the bottom of the first isolation piece being provided with a plurality of guide slots corresponding to the second mounting recesses, the top thereof being provided with a plurality of first engaging slots, the first isolation piece having at both sides thereof a first locking slot corresponding to the first indentation of the isolation base;

c) a first type terminal set axially extended in the first engaging slots, the terminals each having at both sides thereof a plurality of teeth fitting into the first engaging slots in place, the first type terminal set having at the tail thereof first legs, thereby creating a first connection unit;

d) a second isolation piece positioned on the first surface of the isolation base and located in front of the first isolation piece, the bottom of the second isolation piece being provided with a plurality of second engaging slots, the second isolation piece having at both sides thereof a second locking slot corresponding to the second indentation of the isolation base;

e) a third isolation piece mounted on the second surface of the isolation base and having a plurality of third engaging slots at the bottom thereof, the third isolation piece further having at both sides thereof two first and second locking hooks extending upward and corresponding to the first and second indentations, respectively such that the third isolation piece is secured to the bottom of the isolation base by means that first and second locking hooks are hooked into the first and second locking slots of the first and second isolation pieces, thereby combining the isolation base and the isolation pieces together to create a compound connection module;

f) a third type terminal set having at both sides of the front portion thereof teeth engaging into the third engaging slots of the third isolation piece, the third type terminal set further having at the rear portion thereof third legs extending from the third isolation piece, thereby creating a third connection unit; and g) a metal housing made of metal material and meeting the specification of USB A-type plug dimensions, the metal housing enclosing the compound connection module and having a first wall and a second wall at the top and bottom sides thereof, respectively such that a first slot for the electric connection with the female connector of USB 2.0 or USB 3.0 is created between the front portion of the first wall and the first surface of the isolation base, a second slot for the insertion of the Micro SD/T-Flash memory card being created between the second wall of the metal housing and the second surface of the isolation base, the front portion of the third type terminal set being extended into the second slot such that the second slot serves as a thin-type Micro SD/T-Flash memory card-reading slot.

In this way, an isolation base is provided in cooperation with two or three different isolation pieces which are joined by a hooked connection to create a module. The isolation pieces are each provided with an engaging slot. It is possible to choose the desired terminal set of certain type to achieve the predetermined functions of a certain USB specification.

According to the invention, the second type terminal set with the specification of USB 3.0 is axially received within the second engaging slots of the second isolation piece by means that the teeth at both sides of the terminals of the second type terminal set are engaged into the second engaging slots in position. Besides, the tail of the second type terminal set is extended from the second engaging slots, thereby creating the second legs. In this way, a second connection unit is produced.

BRIEF DESCRIPTION OF THE DRAWINGS

The accomplishment of this and other objects of the invention will become apparent from the following descriptions and its accompanying figures of which.

DETAILED DESCRIPTION OF THE PREFERRED EMBODIMENT

First of all, referring to FIGS. 1 through 10, a USB plug 80 in accordance with the invention is an A-Type USB plug having dimensions of 18.5 mm (length), 12 mm (width), and 4.5 mm (height) for the arrangement of a thin type built-in card-reading slot for Micro SD/T-Flash memory card without affecting the normal operation of the USB plug 80. In order to achieve the prearranged effects in the limited space, a preferred embodiment of the invention includes an isolation base 10, a first isolation piece 32, a first type terminal set 20, a second isolation piece 40, a second type terminal set 30, a third isolation piece 51, a third type terminal set 50, and a metal housing 70.

Figure 1:
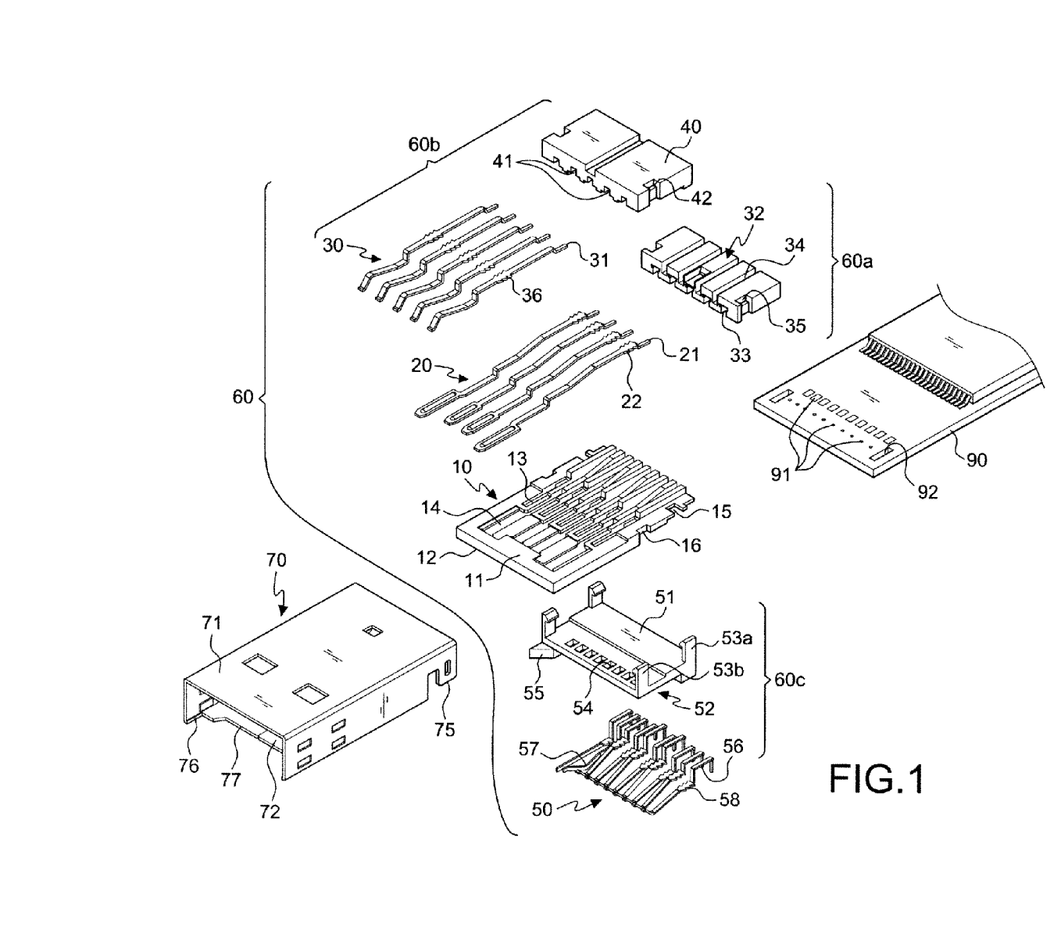
FIG. 1 is an exploded perspective view I of the invention seen from the top in an inclined direction.
Figure 2:
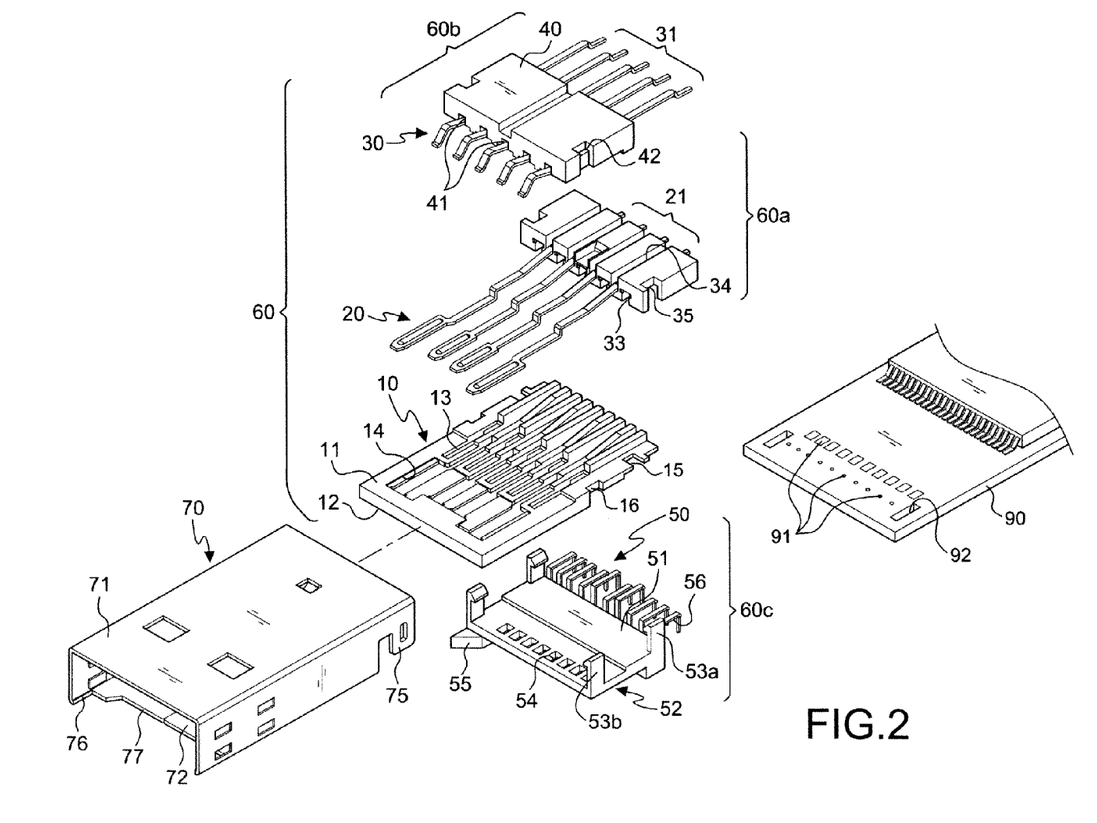
FIG. 2 is an exploded perspective view II of the invention seen from the top in an inclined direction.
Figure 3:
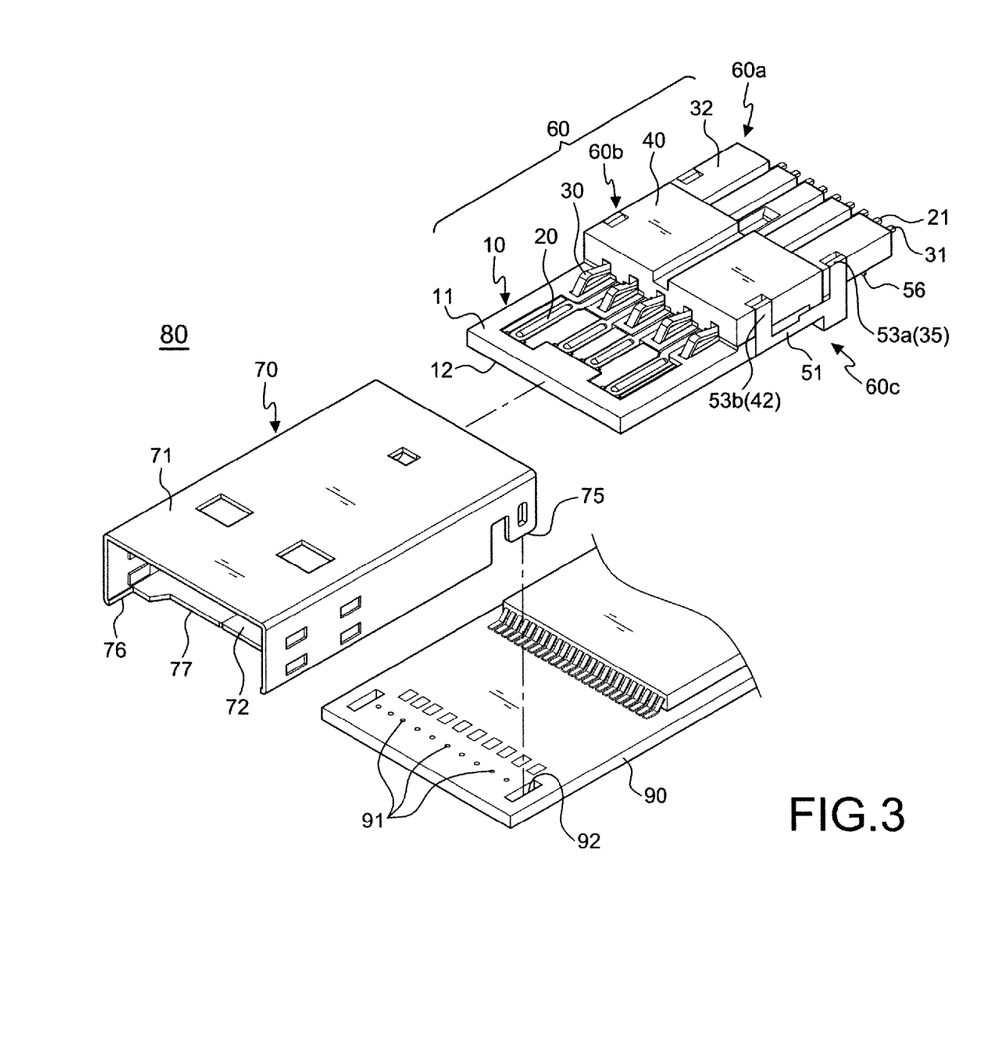
FIG. 3 is an exploded perspective view III of the invention seen from the top in an inclined direction.
Figure 4:
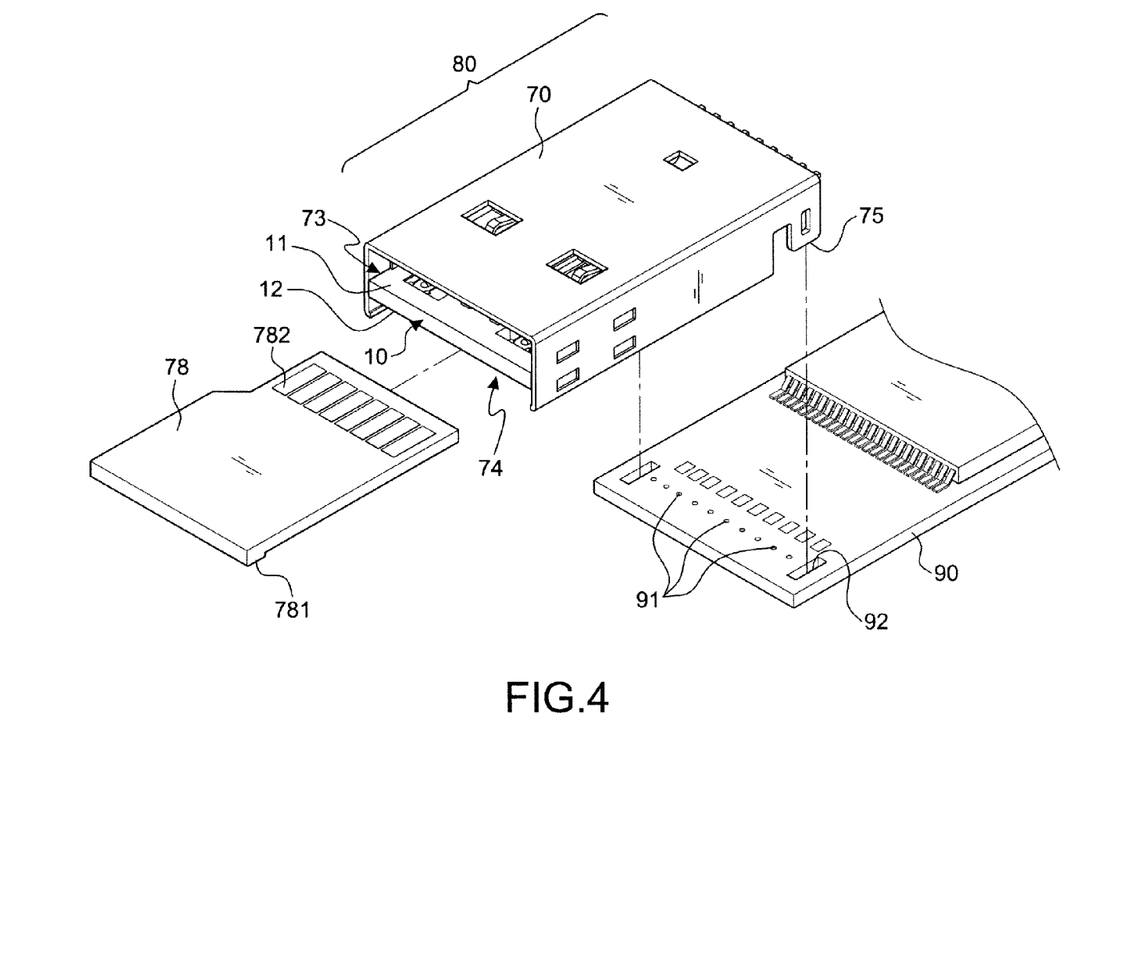
FIG. 4 is a perspective view of the USB plug of the invention seen from the top in an inclined direction.

The isolation base 10 has a first surface 11 and a second surface 12. A plurality of first mounting recesses 14 and second mounting recesses 13 for receiving a plurality of terminals are positioned on the first surface 11. Moreover, the isolation base 10 includes a first indentation 15 and a second indentation 16 at both sides of the rear portion thereof, respectively.

The first isolation piece 32 is mounted on the first surface 11 of the isolation base 10. The bottom of the first isolation piece 32 is provided with a plurality of guide slots 33 corresponding to the first mounting recesses 14. The top thereof is provided with a plurality of first engaging slots 34. Besides, the first isolation piece 32 includes at both sides thereof a first locking slot 35 corresponding to the first indentation 15 of the isolation base 10.

Figure 2A:
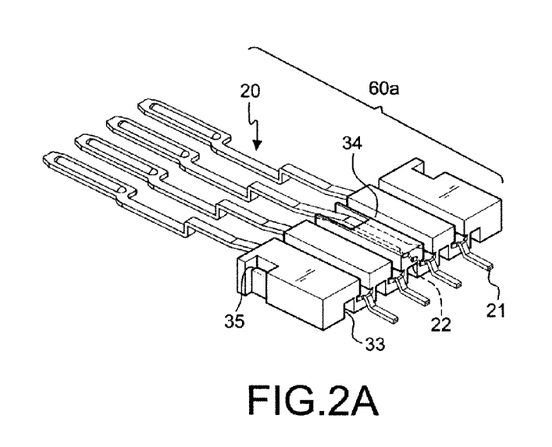
FIGS. 2A through 2C are perspective views of the components in FIG. 2.

The first type terminal set 20 is axially extended in the first engaging slots 34. The terminals each include at both sides thereof a plurality of teeth 22 fitting into the first engaging slots 34 in place, as shown in FIG. 2A. The first type terminal set 20 includes at the tail thereof first legs 21 extending from the first engaging slots 34, thereby creating a first connection unit 60a. According to this embodiment, the first type terminal set 20 meets the requirements of the USB 2.0 terminal structure having four terminals, but should not be limited thereto.

The second isolation piece 40 is positioned on the first surface 11 of the isolation base 10 and located in front of the first isolation piece 32. The bottom of the second isolation piece 40 is provided with a plurality of second engaging slots 41. Besides, the second isolation piece 40 includes at both sides thereof a second locking slot 42 corresponding to the second indentation 16 of the isolation base 10.

The third isolation piece 51 is mounted on the second surface 12 of the isolation base 10 and includes a plurality of third engaging slots 52 at the bottom thereof. The third isolation piece 51 further includes at both sides thereof two first and second locking hooks 53a, 53b extending upward and corresponding to the first and second indentations 15, 16, respectively such that the third isolation piece 51 is secured to the bottom of the isolation base 10 by means that first and second locking hooks 53a, 53b are hooked into the first and second locking slots 35, 42 of the first and second isolation pieces 32, 40. In this way, the isolation base 10 and the isolation pieces 32, 40, 51 are combined together to create a compound connection module 60.

The third type terminal set 50 includes at the front portion thereof teeth 58 engaging into the third engaging slots 52 of the third isolation piece 51. The third type terminal set 50 further includes at the rear portion thereof third legs 56 extending from the third isolation piece 51, thereby creating a third connection unit 60c.

Figure 2B:
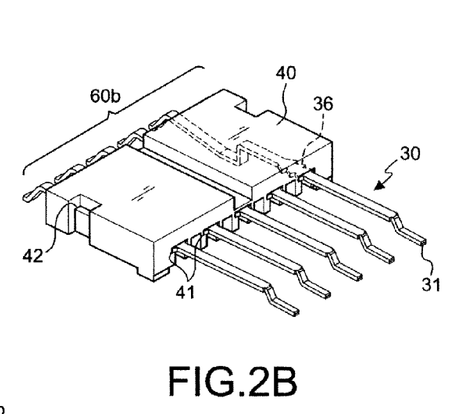
Figure 2C:
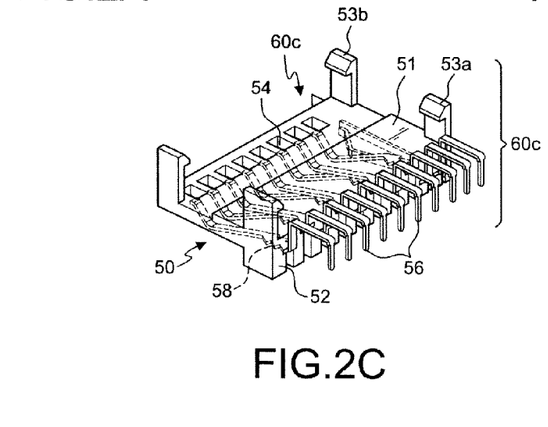

FIGS. 2A through 2C illustrate the connection of the isolation pieces 32, 40, 51 to the terminal sets 20, 30, 50 in another direction, respectively.

Based on the above-mentioned structure, the isolation base 10 can be combined with the isolation pieces 32, 40, 51 by use of the hooked connection to create the compound connection module 60. The advantage of this structure lies in that the terminal sets can optionally fit into the first engaging slots 34, the second engaging slots 41 and/or third engaging slots 52 of the isolation pieces 32, 40, 51 according to different requirements on production. The engaging slots 34, 41, 52 are each provided with a T-shaped groove into which the teeth 22, 36, 58 at both sides of the terminal sets 20, 30, 50 are engaged in position.

The first isolation piece 32 and the second isolation piece 40 can separately be two isolation pieces for installing two terminal sets in different specifications. Alternatively, they can be combined into a body by means that the first isolation piece 32 is shifted forward to create the shape like the second isolation piece 40. In this way, a further connection to the third isolation piece 51 is achieved to create a compound connection module 60.

In addition, the second type terminal set 30 with the specification of USB 3.0 is axially received within the second engaging slots 41 of the second isolation piece 40 by means that the teeth 36 at both sides of the second type terminal set 30 are engaged into the second engaging slots 41 in position, as shown in FIG. 2B. The tail of the second type terminal set 30 is extended from the second engaging slots 41, thereby creating the second legs 31. In this way, a second connection unit 60b is produced. The second type terminal set 30 is constructed according to the USB 3.0 specification and includes five terminal pieces, but should not be limited thereto. By the way, the tail of the second type terminal set 30 is received within the guide slots 33 of the first isolation piece 32.

Figure 11:
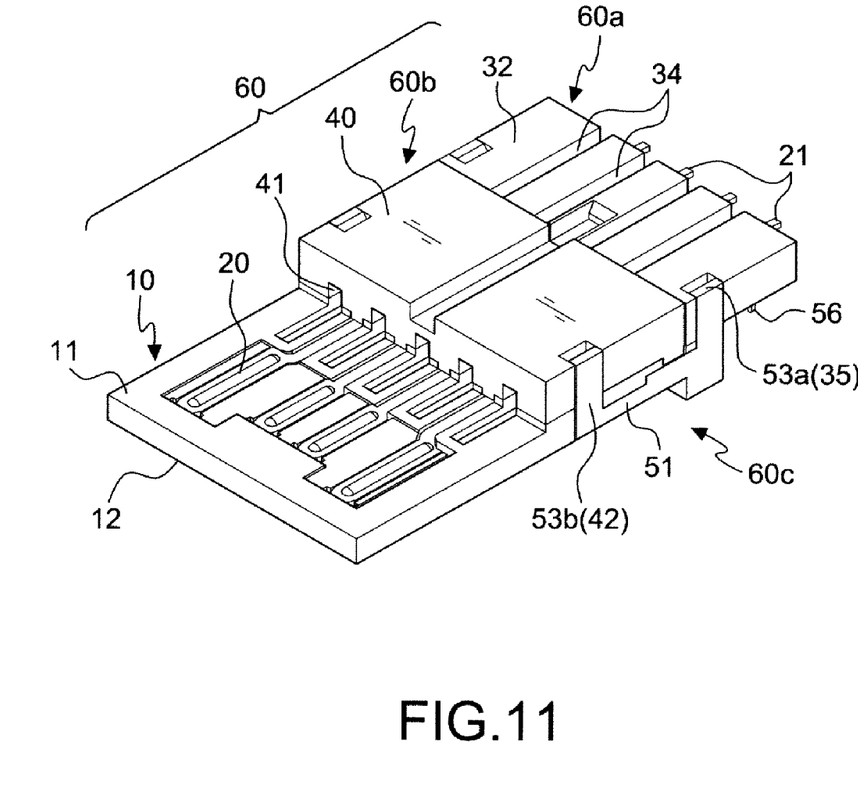
FIG. 11 is a perspective view of another embodiment of the compound connection module of the invention.
Figure 12:
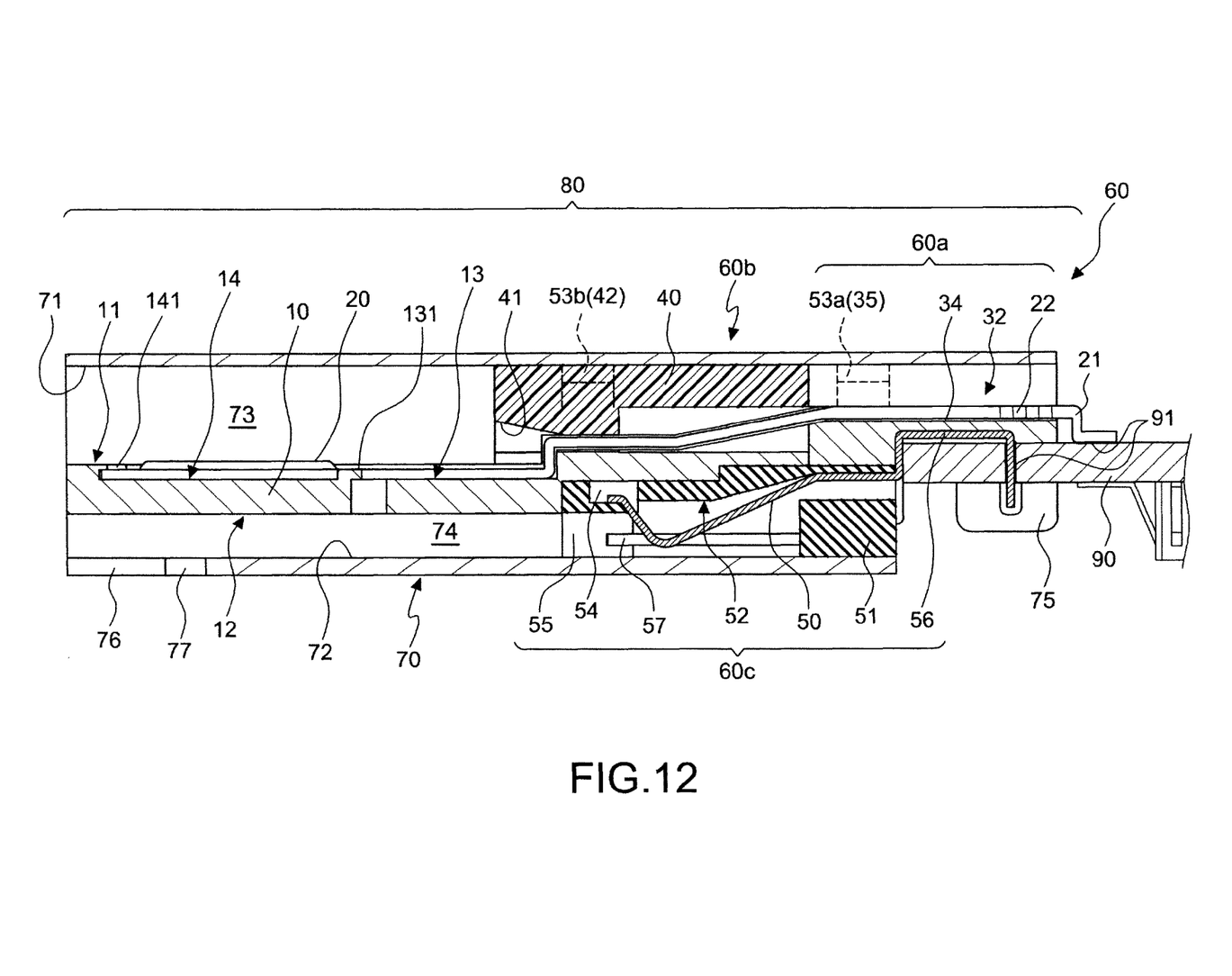
FIG. 12 is a section view of another embodiment of the compound connection module of the invention.

According to the above-mentioned structure, the compound connection module 60 serves as a main body. The manufacturer may determine if the terminal sets are each pre-mounted on the isolation pieces. However, the precondition is that the first type terminal set 20 and the third type terminal set 50 are necessary for the structure of the present invention. In other words, the second type terminal set 30 can be mounted depending on the needs for achieving the predetermined effect. According to the embodiment shown in FIGS. 4 through 10, the compound connection module 60 consists of the first type terminal set 20, the second type terminal set 30 and the third type terminal set 50, but should not be limited thereto. According to the embodiment shown in FIGS. 11 and 12, the first surface 11 only receives the first type terminal set 20 to create the first connection unit 60a while the second connection unit 60b does not have the second type terminal set 30. Besides, the third type terminal set 50 may be mounted on the second surface to create the third connection unit 60c. Accordingly, it is possible to pre-select the terminal sets of the connection to form the compound connection module 60 in different configurations, thereby achieving the multifunctional assembly effect.

The metal housing 70 is made of metal material and meets the specification of USB A-type plug dimensions. The metal housing 70 encloses the compound connection module 60 and includes a first wall 71 and a second wall 72 at the top and bottom sides thereof, respectively such that a first slot 73 for the electric connection with the female connector of USB 2.0 or USB 3.0 (not shown in FIGS.) is created between the front portion of the first wall 71 and the first surface 11 of the isolation base 10. Moreover, a second slot 74 for the insertion of the Micro SD/T-Flash memory card 78 is created between the second wall 72 and the second surface 12 of the isolation base 10. In addition, the front portion of the third type terminal set 50 is extended into the second slot 74 such that the second slot 74 serves as a Micro SD/T-Flash memory card-reading slot. According, a USB plug 80 with a built-in card-reading slot is created.

The USB plug 80 based on the above-mentioned means is the same as the prior art (U.S. Pat. No. 7,575,481) in shape and electric function, but the overall assembly structure thereof is different from that of the prior art. The overall structure of the invention is divided into three connection units 60a, 60b, 60c having different functions. In other words, the isolation pieces 32, 40, 51 are designed based on the unique features of the terminal sets 30, 20, 50 such that the individual connection units 60a, 60b, 60c can be quickly assembled to be the compound connection module 60. The manufacturing of the invention is more convenient than the prior art. The combination of the above-mentioned components can depend on the needs. In other words, the specifications of USB 2.0 and/or USB 3.0 are available for use. The specification can be determined first before leaving the factory. After mounted with the metal housing 70, the USB plug 80 with the pre-determined function is available.

Figure 5:
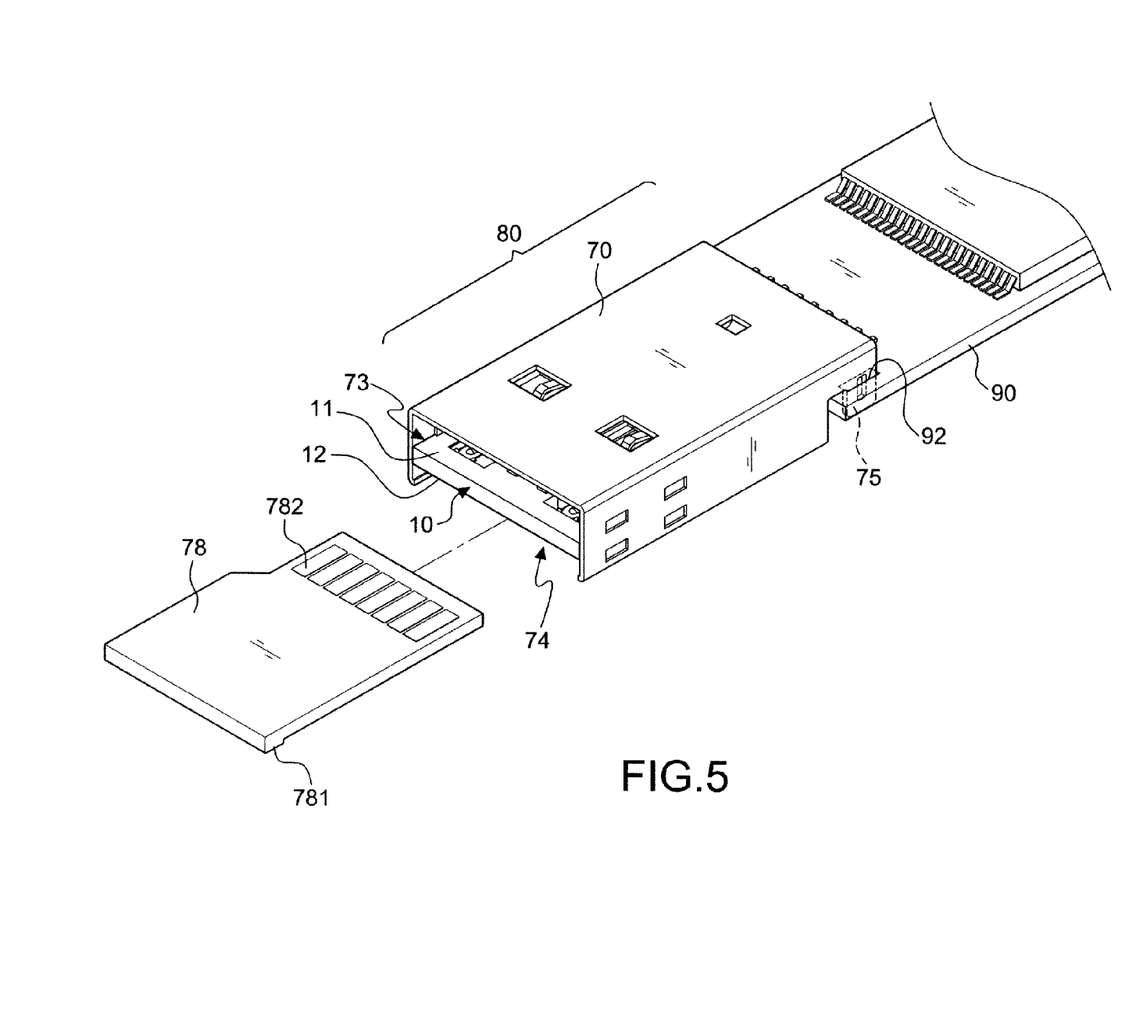
FIG. 5 is a perspective view of the USB plug and the circuit board of the invention seen from the top in an inclined direction.

Based on the above-mentioned USB plug 80, the legs 21, 31, 56 of the connection units 60a, 60b, 60c are positioned at the tail of the compound connection module 60, thereby forming an independent connection element. According to this embodiment, the compound connection module 60 is connected to a circuit board 90, but should not be limited thereto. The connection to all kinds of 3C (computer/communication/consumer electronics) electronic products is also possible. More description thereof won't be given hereinafter. The circuit board 90 includes connection interfaces 91 for the electric connection with the legs 21, 31, 56. This permits an easy and convenient use.

According to the embodiment, the circuit board 90 includes at both sides of the connection interfaces 91 two through holes 92 while the metal housing 70 has at both sides of the rear thereof two convex lugs 75 for fitting into the through holes 92 to achieve a reliable interconnection.

The external portion of the second wall 72 of the metal housing 70 includes an indentation 76 and a recess 77 for the accommodation of the projecting portion 781 at the external side of the memory card 78. In this way, the shape is still consistent with the specification of the USB plug after the memory card 78 is inserted into the second slot 74. As a result, the normal operation of the USB plug won't be affected when the connection with the end portion of the pre-determined electronic product takes place.

According to the embodiment, the shape and the number of the first type terminal set 20 depend on the specification of USB 3.0 while the shape and the number of the second type terminal set 30 depend on the specification of USB 3.0.

Referring to FIGS. 1 through 7 together with FIGS. 8 through 10, the structure of the connection units 60a, 60b, 60c will be detailed hereinafter. The front walls of the first mounting recesses 14 of the isolation base 10 each include a plurality of first positioning slots 141 (shown as FIG. 6) for the insertion of the front end of the first type terminal set 20 in place. Meanwhile, the second mounting recesses 13 each include a plurality of second positioning slots 131 for the insertion of the front end of the second type terminal set 30 in place. Besides, the second positioning slots 131 have space permitting the downward shift of the front end of the second type terminal set 30.

In addition, the third isolation piece 51 includes at front portion thereof a plurality of third positioning slots 54 for the insertion of the front end of the third type terminal set 50 in place. Besides, the third positioning slots 54 have space permitting the upward shift of the front end of the third type terminal set 50.

Figure 6:
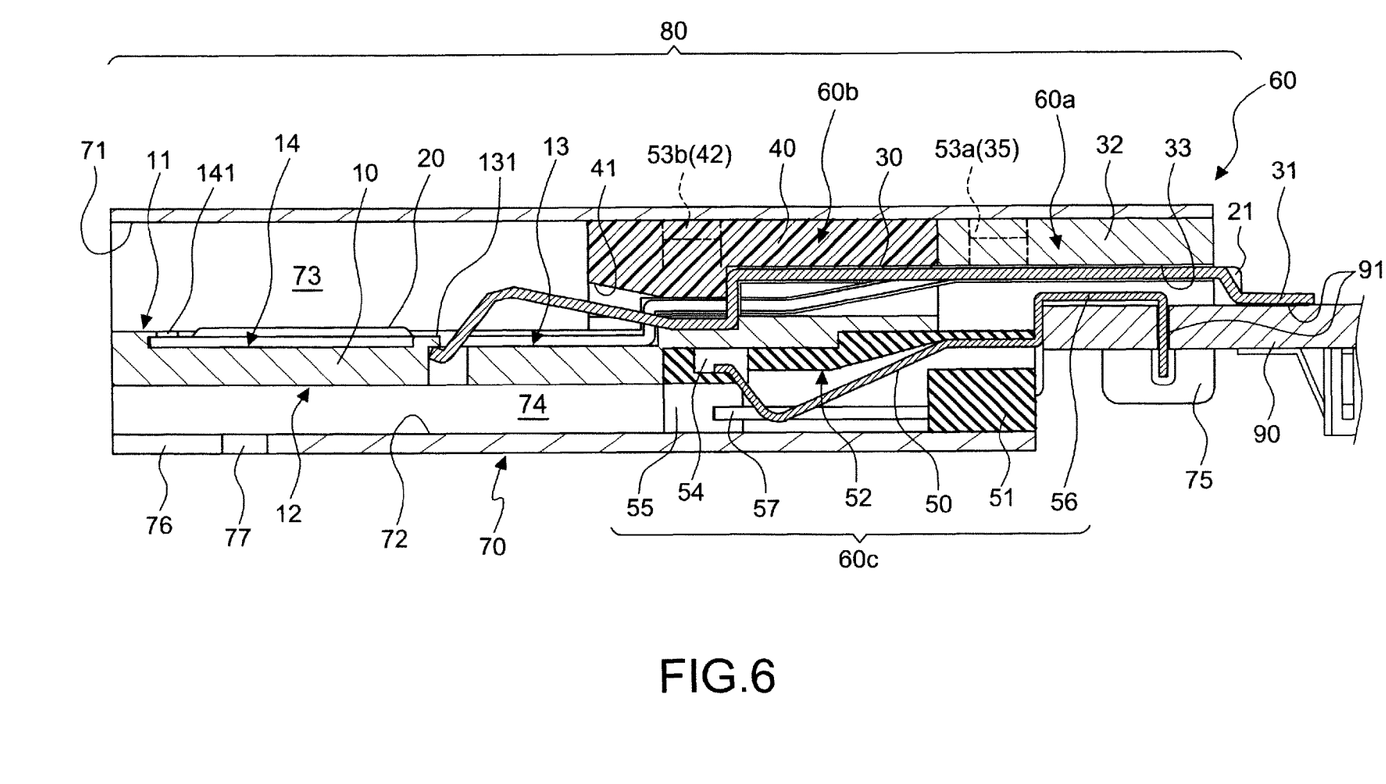
FIG. 6 is a section view of the invention.
Figure 7:
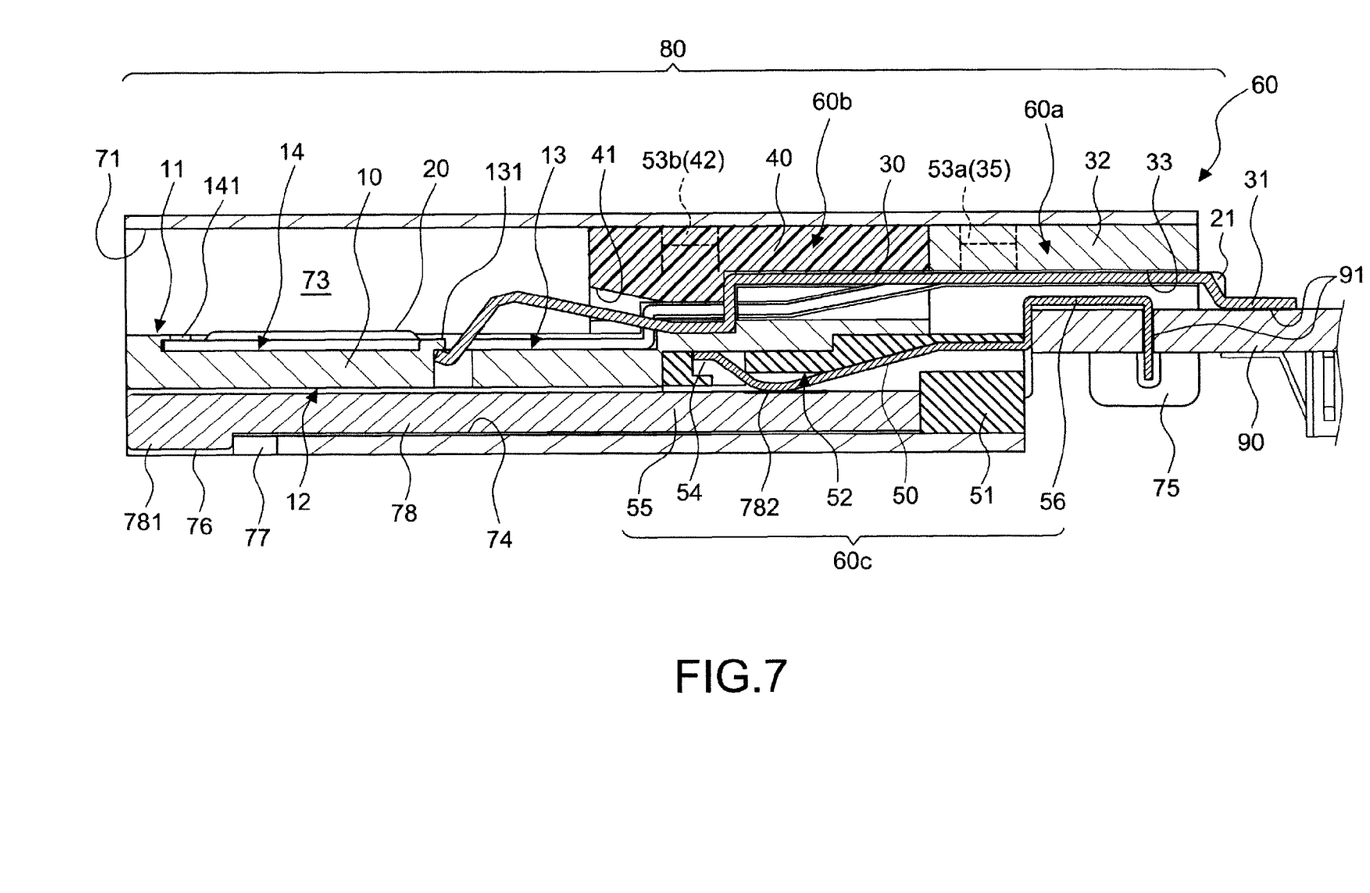
FIG. 7 is a section view of the invention, showing a thin type memory card is inserted.

FIG. 6 illustrates the position before the memory card 78 fits into the second slot 74. FIG. 7 illustrates the position after the memory card 78 fits into the second slot 74 such that the electric interface 782 is in contact with the third type terminal set 50 to establish the electric connection, thereby creating the structure of the built-in card-reading slot.

Figure 8:
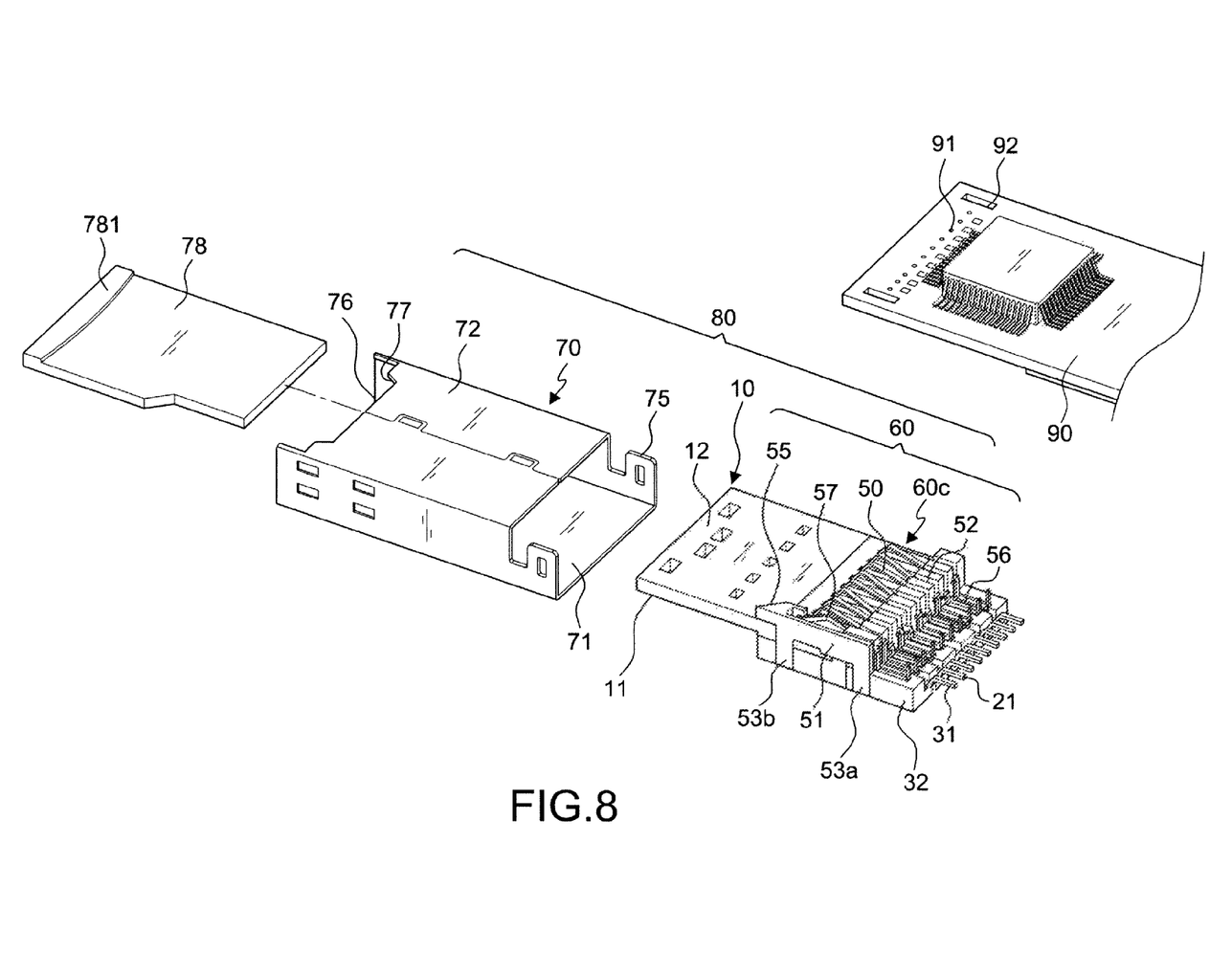
FIG. 8 is an exploded perspective view I of the invention seen from the bottom in an inclined direction.
Figure 9:
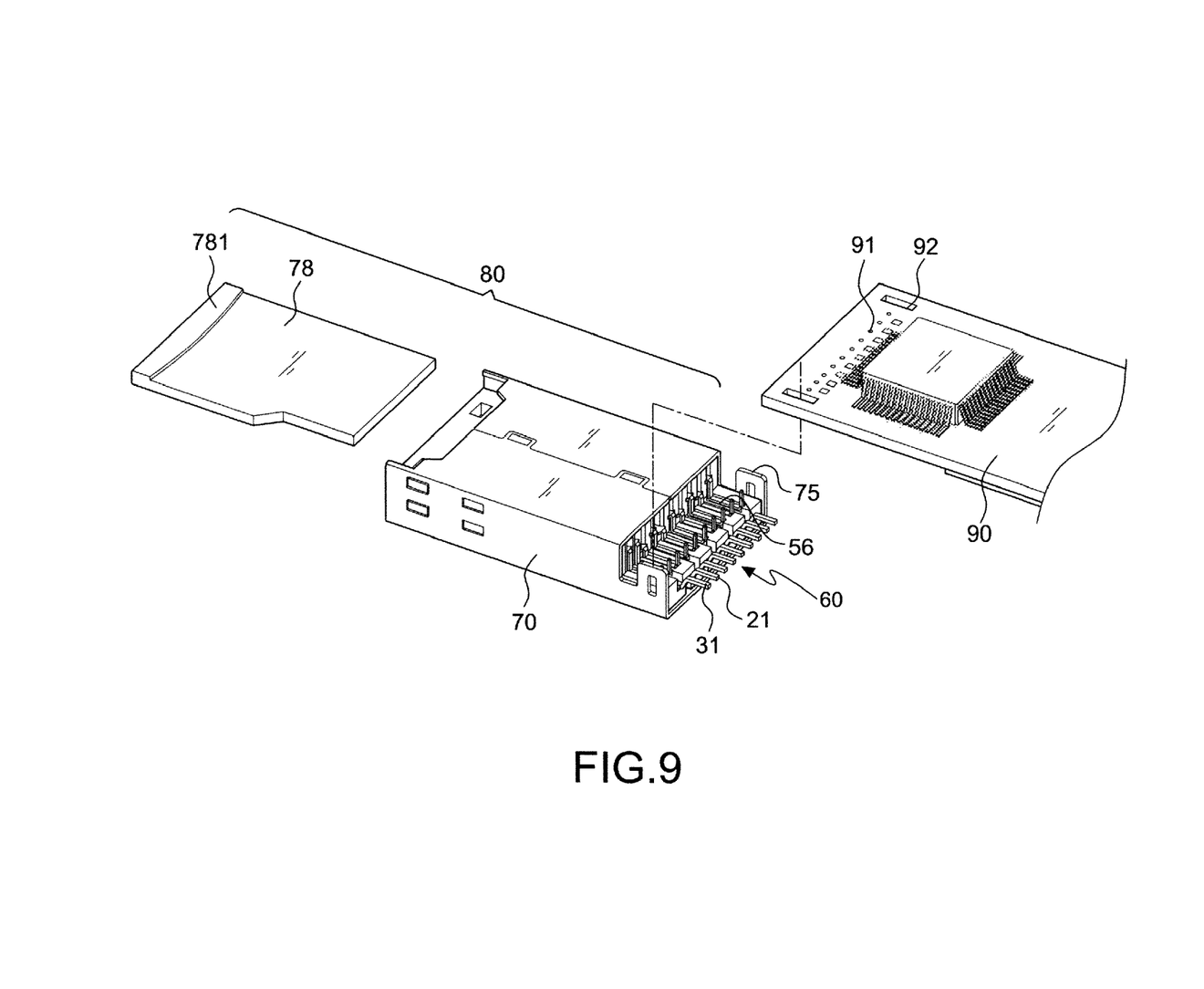
FIG. 9 is an exploded perspective view II of the invention seen from the bottom in an inclined direction.
Figure 10:
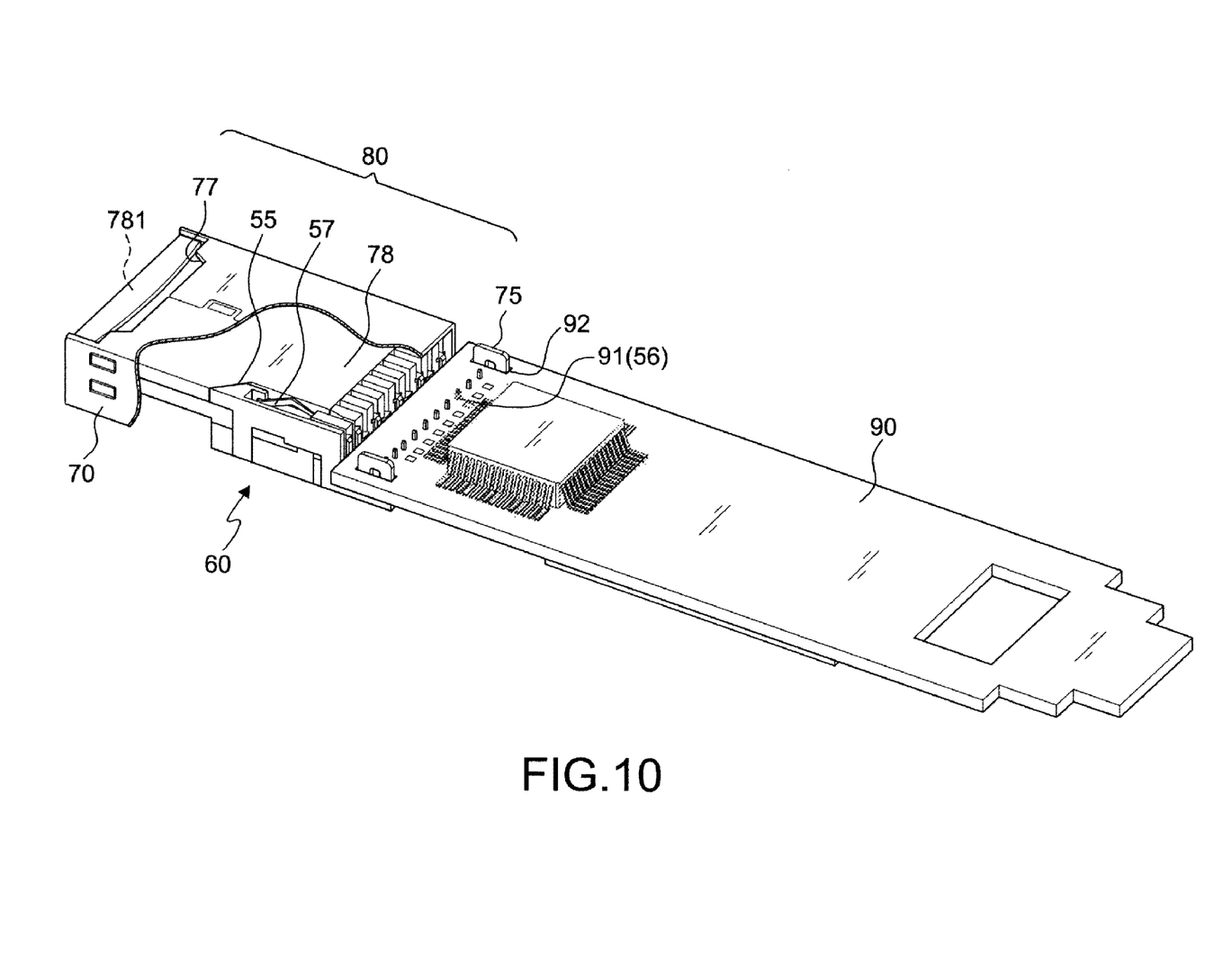
FIG. 10 is a cutaway view of the invention in an assembly position seen from the bottom in an inclined direction.

Moreover, as shown in FIGS. 8 through 10, the bottom of the third isolation piece 51 includes at one side thereof a fool-proof guide slope 55 corresponding to the shape of the memory card 78. Moreover, a fourth terminal 57 laterally extending inward is positioned near the rear side of the fool-proof guide slope 55 for determining if the memory card 78 fits into the second slot 74.

According to the present invention, the combined structure of a USB plug with a built-in card-reading slot permits a more convenient manufacturing, meets the requirements in the industry and ensures a practical use.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A combined structure of a USB plug with a built-in card-reading slot, and more particularly, an A-Type USB plug with a built-in card-reading slot, comprising:
   a) an isolation base having a first surface and a second surface, a plurality of first mounting recesses and second mounting recesses for receiving a plurality of terminals being positioned on the first surface, the isolation base further having a first indentation and a second indentation at both sides of the rear portion thereof, respectively;
   b) a first isolation piece mounted on the first surface of the isolation base, the bottom of the first isolation piece being provided with a plurality of guide slots corresponding to the first mounting recesses, the top thereof being provided with a plurality of first engaging slots, the first isolation piece having at both sides thereof a first locking slot corresponding to the first indentation of the isolation base;
   c) a first type terminal set axially extended in the first engaging slots, the terminals each having at both sides thereof a plurality of teeth fitting into the first engaging slots in place, the first type terminal set having at the tail thereof first legs, thereby creating a first connection unit;
   d) a second isolation piece positioned on the first surface of the isolation base and located in front of the first isolation piece, the bottom of the second isolation piece being provided with a plurality of second engaging slots, the second isolation piece having at both sides thereof a second locking slot corresponding to the second indentation of the isolation base;
   e) a third isolation piece mounted on the second surface of the isolation base and having a plurality of third engaging slots at the bottom thereof, the third isolation piece further having at both sides thereof two first and second locking hooks extending upward and corresponding to the first and second indentations, respectively such that the third isolation piece is secured to the bottom of the isolation base by means that first and second locking hooks are hooked into the first and second locking slots of the first and second isolation pieces, thereby combining the isolation base and the isolation pieces together to create a compound connection module;
   f) a third type terminal set having at both sides of the front portion thereof teeth engaging into the third engaging slots of the third isolation piece, the third type terminal set further having at the rear portion thereof third legs extending from the third isolation piece, thereby creating a third connection unit; and
   g) a metal housing made of metal material and meeting the specification of USB A-type plug dimensions, the metal housing enclosing the compound connection module and having a first wall and a second wall at the top and bottom sides thereof, respectively such that a first slot for the electric connection with the female connector of USB 2.0 or USB 3.0 is created between the front portion of the first wall and the first surface of the isolation base, a second slot for the insertion of the Micro SD/T-Flash memory card being created between the second wall of the metal housing and the second surface of the isolation base, the front portion of the third type terminal set being extended into the second slot such that the second slot serves as a Micro SD/T-Flash memory card-reading slot.

2. The combined structure of a USB plug with a built-in card-reading slot as recited in claim 1 wherein the first type terminal set meets the specification of USB 2.0.

3. The combined structure of a USB plug with a built-in card-reading slot as recited in claim 2 wherein the second type terminal set with the specification of USB 3.0 is axially received within the second engaging slots of the second isolation piece by means that the teeth at both sides of the terminals of the second type terminal set are engaged into the second engaging slots in position, and wherein the tail of the second type terminal set is extended from the second engaging slots, thereby creating the second legs; in this way, a second connection unit is produced.

4. The combined structure of a USB plug with a built-in card-reading slot as recited in claim 3 wherein the first isolation piece and the second isolation piece are separated or combined together into a body.

5. The combined structure of a USB plug with a built-in card-reading slot as recited in claim 3 wherein the compound connection module is connected to a circuit board having connection interfaces for the electric connection with the legs.

6. The combined structure of a USB plug with a built-in card-reading slot as recited in claim 5 wherein the circuit board includes at both sides of the connection interfaces two through holes while the metal housing has at both sides of the rear thereof two convex lugs for fitting into the through holes to achieve a reliable interconnection.

7. The combined structure of a USB plug with a built-in card-reading slot as recited in claim 6 wherein the external portion of the second wall of the metal housing includes an indentation and a recess for the accommodation of the projecting portion at the external side of the memory card; and wherein the shape is still consistent with the specification of the USB plug after the memory card is inserted into the second slot, whereby the normal operation of the USB plug won't be affected when the connection with the end portion of the pre-determined electronic product takes place.

8. The combined structure of a USB plug with a built-in card-reading slot as recited in claim 7 wherein the front walls of the first mounting recesses of the isolation base each include a plurality of first positioning slots for the insertion of the front end of the first type terminal set in place, and wherein the second mounting recesses each include a plurality of second positioning slots for the insertion of the front end of the second type terminal set in place, and wherein the second positioning slots have space permitting the downward shift of the front end of the second type terminal set.

9. The combined structure of a USB plug with a built-in card-reading slot as recited in claim 7 wherein the third isolation piece includes at front portion thereof a plurality of third positioning slots for the insertion of the front end of the third type terminal set in place, and wherein the third positioning slots have space permitting the upward shift of the front end of the third type terminal set.

10. The combined structure of a USB plug with a built-in card-reading slot as recited in claim 7 wherein the bottom of the third isolation piece includes at one side thereof a fool-proof guide slope corresponding to the shape of the memory card, and wherein a fourth terminal laterally extending inward is positioned near the rear side of the fool-proof guide slope for determining if the memory card fits into the second slot.

* * * * *